(12) United States Patent
Pinilla Pico et al.

(10) Patent No.: US 11,104,529 B2
(45) Date of Patent: Aug. 31, 2021

(54) AUTOMATED LOADING SERVICES FOR COMPUTER ASSISTED OR AUTONOMOUS DRIVING VEHICLES

(71) Applicant: Intel Corporation, Santa Clara, CA (US)

(72) Inventors: Lady Nataly Pinilla Pico, El Dorado Hills, CA (US); Melissa M. Ortiz, Campbell, CA (US); Gayathri Jeganmohan, Folsom, CA (US); Wei Yee Koay, Penang (MY); Shahrnaz Azizi, Cupertino, CA (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 16/140,479

(22) Filed: Sep. 24, 2018

(65) Prior Publication Data

US 2019/0047801 A1    Feb. 14, 2019

(51) Int. Cl.
*G05D 1/00* (2006.01)
*B65G 67/04* (2006.01)
*G05D 1/02* (2020.01)

(52) U.S. Cl.
CPC ........... *B65G 67/04* (2013.01); *G05D 1/0088* (2013.01); *G05D 1/0225* (2013.01); *G05D 2201/0213* (2013.01)

(58) Field of Classification Search
CPC ................................ B65G 67/04; B60P 3/007
See application file for complete search history.

(56) References Cited

U.S. PATENT DOCUMENTS

| | | | |
|---|---|---|---|
| 10,222,798 B1* | 3/2019 | Brady | G05D 1/0225 |
| 10,300,832 B1* | 5/2019 | Folks | B60P 3/423 |
| 10,482,421 B1* | 11/2019 | Ducrou | G06K 9/00671 |
| 2012/0158627 A1* | 6/2012 | Arunapuram | G06Q 10/06 706/13 |
| 2015/0379468 A1* | 12/2015 | Harvey | G06Q 10/08355 705/338 |
| 2018/0018619 A1* | 1/2018 | Kisiler | G01C 21/3453 |
| 2018/0330319 A1* | 11/2018 | Liang | G05D 1/0088 |
| 2019/0043370 A1* | 2/2019 | Mulhall | B64D 1/08 |
| 2019/0047356 A1* | 2/2019 | Ferguson | B60P 3/0257 |
| 2019/0250636 A1* | 8/2019 | Szubbocsev | G06Q 10/08355 |

* cited by examiner

*Primary Examiner* — Timothy R Waggoner
(74) *Attorney, Agent, or Firm* — Schwabe, Williamson & Wyatt, P.C.

(57) ABSTRACT

Embodiments include apparatuses, methods, and systems to provide an automated loading device to a computer assisted or autonomous driving (CA/AD) vehicle. A loading service control device is to initiate a loading service to load one or more items into a storage space of a CA/AD vehicle, using an automated loading device. A CA/AD vehicle is to move to a loading area at an appointed time. A mechanical loading unit of an automated loading device is to place one or more items into a storage space of a CA/AD vehicle. A user device is to receive an input from a user, where the input includes information to generate a request to a loading service control device to load one or more items into a storage space of a CA/AD vehicle using an automated loading device. Other embodiments may also be described and claimed.

15 Claims, 8 Drawing Sheets

AUTOMATED LOADING SERVICES FOR COMPUTER ASSISTED OR AUTONOMOUS DRIVING VEHICLES

FIELD

Embodiments of the present disclosure relate generally to the technical fields of computer assisted or autonomous driving, and more particularly to automated loading services for computer assisted or autonomous driving vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computer assisted or autonomous driving (CA/AD) vehicles are becoming more and more popular. CA/AD vehicles are not only set to change the automotive industry, but users of CA/AD vehicles also expect improved driving and service experiences related to CA/AD vehicles.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
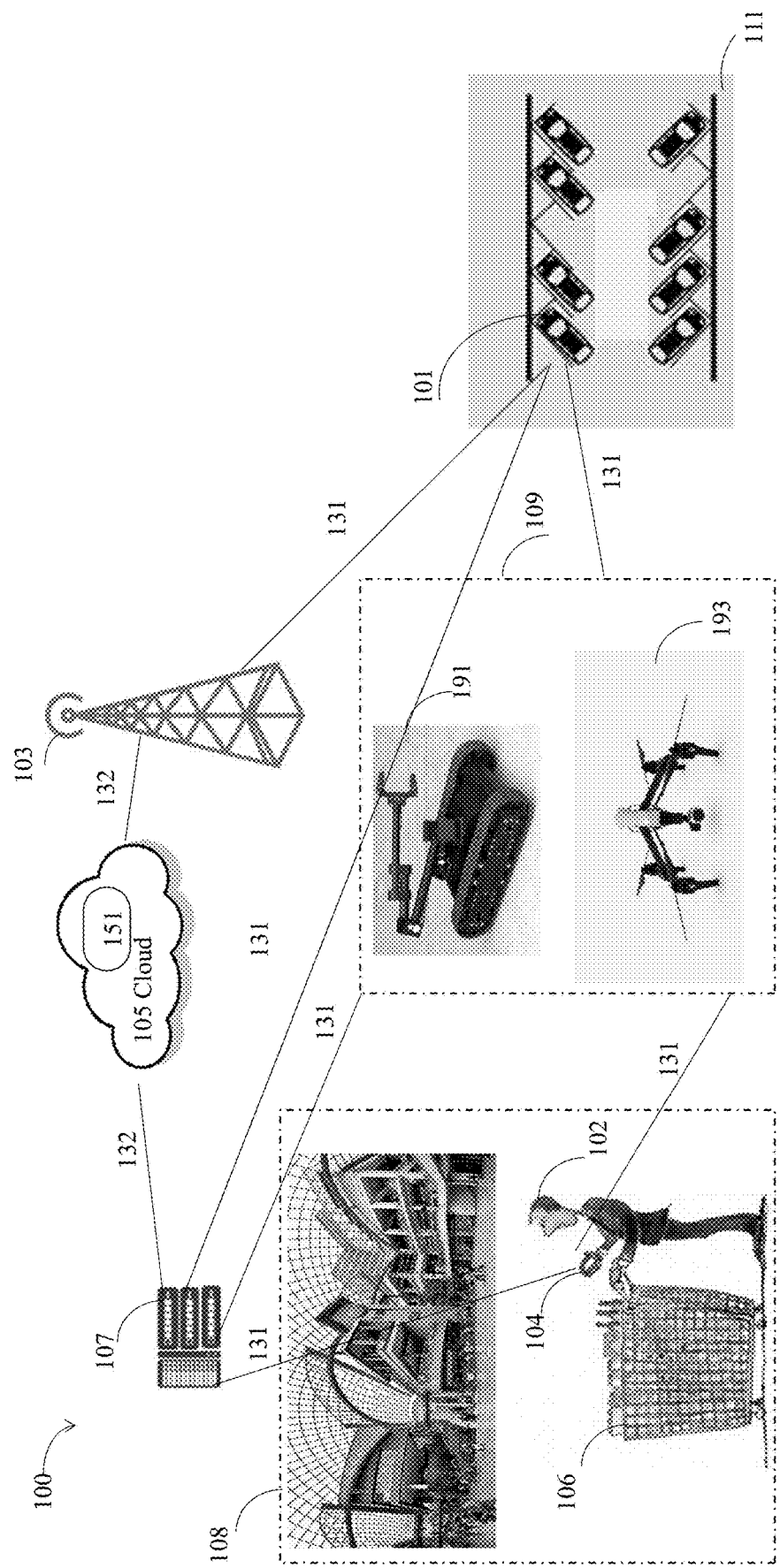
FIG. 1 illustrates an example system including a loading service control device and an automated loading device to provide a loading service to load one or more items into a storage space of a computer assisted or autonomous driving (CA/AD) vehicle, in accordance with various embodiments.

Computer assisted or autonomous driving (CA/AD) vehicles are changing the automotive industry. Users of CA/AD vehicles also expect improved driving and service experiences related to CA/AD vehicles. For example, when a user drives a CA/AD vehicle to a shopping location to purchase one or more items, e.g., groceries or luggage items, it will be a helpful user experience to provide an automated loading device to load one or more items into a storage space of a CA/AD vehicle.

Currently, there are some mechanical systems that can help disabled people to get into a car or a bus by lifting elevator type level so that people do not have to climb stair or vehicle steps. Additionally, trucks may have a lifting system to carry big items. However, such systems may work as mechanical devices to load one single item, e.g., a disabled person, without automated coordination, and hence cannot provide a seamless shopping experience for a user.

Embodiments herein may provide solutions for a loading service control device to control an automated loading device to load one or more items into a storage space of a CA/AD vehicle. For example, a loading service control device is to receive a user request from a user device for a loading service. The loading service control device is to initiate the loading service to load one or more items at a first location into a storage space of a CA/AD vehicle, using an automated loading device, wherein the CA/AD vehicle is parked at a second location. Furthermore, the automated loading device is to load and pack one or more items into a storage space of a CA/AD vehicle without human intervention. In addition, embodiments herein may use sensed and contextual data to improve the placement of the items within the CA/AD vehicle taking into consideration user behavior, weather conditions, and information about the items transported.

In embodiments, an apparatus for CA/AD includes a communication interface disposed in a CA/AD vehicle and a control unit coupled to the communication interface. The communication interface is to receive information from a loading service control device to load one or more items into a storage space of the CA/AD vehicle, using an automated loading device. The received information may include characteristics of the one or more items, locations of the one or more items, a time to load the one or more items, or one or more environment parameters. The control unit is to issue instructions to a navigation system of the CA/AD vehicle to move the CA/AD vehicle to a loading area at an appointed time, based on the received information.

In embodiments, an apparatus for CA/AD includes a communication interface and a mechanical loading unit coupled to the communication interface. The communication interface is to receive information from a loading service control device. The mechanical loading unit is to place one or more items into a storage space of a CA/AD vehicle, based on the received information including a user profile, information about the CA/AD vehicle, characteristics of the one or more items, or one or more environment parameters.

In embodiments, an apparatus for CA/AD includes a data collection unit and a controller coupled to the data collection unit. The data collection unit is to collect data from one or more data sources. Based on the collected data including a user request from a user device for a loading service, the controller is to initiate the loading service to load one or more items at a first location into a storage space of a CA/AD vehicle, using an automated loading device, where the CA/AD vehicle is parked at a second location.

In embodiments, an apparatus for CA/AD includes a user interface and a communication unit coupled to the user interface. The user interface is to receive an input from a user, wherein the input includes information to generate a request to a loading service control device to load one or more items into a storage space of a CA/AD vehicle using an automated loading device. The communication unit is to send the request for the loading service by the automated loading device.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

As used herein, the term semi-autonomous driving is synonymous with computer-assisted driving. The term does not mean exactly 50% of the driving functions are automated. The percentage of automated driving functions may vary between 0% and 100%. In addition, it will be appreciated that the hardware, circuitry and/or software implementing the semi-autonomous driving may temporarily provide no automation, or 100% automation, such as in response to an emergency situation.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The terminology used herein is for the purpose of describing particular embodiments only and is not intended to be limiting of the disclosure. As used herein, the singular forms "a," "an" and "the" are intended to include plural forms as well, unless the context clearly indicates otherwise. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

As used hereinafter, including the claims, the term "unit," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example system 100 including a loading service control device 107 and an automated loading device 109 to provide a loading service to load one or more items 106 into a storage space of a CA/AD vehicle 101, in accordance with various embodiments. For clarity, features of the system 100, the CA/AD vehicle 101, the one or more items 106, the loading service control device 107, and the automated loading device 109 are described below as an example for understanding an example system including a loading service control device and an automated loading device to provide a loading service to load one or more items into a storage space of a CA/AD vehicle. It is to be understood that there may be more or fewer components included in the system 100, the CA/AD vehicle 101, the one or more items 106, the loading service control device 107, and the automated loading device 109. Further, it is to be understood that one or more of the devices and components within the system 100, the CA/AD vehicle 101, the one or more items 106, the loading service control device 107, and the automated loading device 109 may include additional and/or varying features from the description below, and may include any devices and components that one having ordinary skill in the art would consider and/or refer to as the devices and components of a system including a loading service control device and an automated loading device to provide a loading service to load one or more items into a storage space of a CA/AD vehicle.

In embodiments, the system 100 includes the CA/AD vehicle 101, a user device 104, the one or more items 106, the loading service control device 107, and the automated loading device 109. The user 102 may provide an input to the user device 104 to generate a request to the loading service control device 107 to load the one or more items 106 into a storage space of the CA/AD vehicle 101 using the automated loading device 109, e.g., a robot 191 or a drone 193. The one or more items 106 is located at a first location 108, which may be an area within a shopping mall area, e.g., a shopping mall loading area, while the CA/AD vehicle 101 is located in a second location 111, e.g., a parking lot of the shopping mall. Furthermore, the system 100 includes a roadside unit (RSU) 103, and a cloud computing environment ("cloud" for short) 105. [As used herein, unless the context clearly indicates otherwise, the term "cloud" does not refer to a visible mass of condensed water vapor floating in the atmosphere/sky.] The cloud 105 includes a number of cloud servers 151, which may include e.g., an application server.

In some embodiments, the loading service control device 107 may be located in the cloud 105, located in the premise of a shopping mall, or located with a retailer or a third party loading service provider. The automated loading device 109, e.g., the robot 191 or the drone 193, may be separated from the CA/AD vehicle 101. In some other embodiments, the automated loading device 109 may be installed as part of a moving cart, or located in a fixed device at the first location 108. Further, the automated loading device 109 may be installed as a part of the CA/AD vehicle 101. For some embodiments, the CA/AD vehicle 101 may launch the automated loading device 109 away from the CA/AD vehicle 101 to load the one or more items 106 into a storage space of a CA/AD vehicle 101. For some embodiments, the automated loading device 109 may remain attached to the CA/AD vehicle 101, and reach or extend out to load the one or more items 106 into a storage space of a CA/AD vehicle 101 (and retract after loading).

The communication between the CA/AD vehicle 101, the RSU 103, the user device 104, the cloud 105, or the cloud server 151, the loading service control device 107, and the automated loading device 109, may employ wireless technology, e.g., a part of a vehicle-to-infrastructure (V2I) communications. For example, the CA/AD vehicle 101 may communicate with the RSU 103, the cloud 105, or the cloud server 151, via wireless technology 131. In addition, the CA/AD vehicle 101, the user device 104, and the automated loading device 109, may use a same or different wireless technology 131 to communicate with the loading service control device 107, or with each other. The wireless technology 131 may include a selected one of dedicated short range communications (DSRC) technology, Bluetooth technology, wireless fidelity (WiFi) technology, wireless local network (WLAN), cellular wireless network technology, short range radio technology, or any other wireless technology. In addition, the RSU 103 or the loading service control device 107 may communicate with the cloud 105 by a link 132, which may be a wireless or wired connection.

In embodiments, the CA/AD vehicle 101 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)). For example, the CA/AD vehicle 101 is a selected one of a commercial truck, a light duty car, a sport utility vehicle (SUV), a light vehicle, a heavy duty vehicle, a pickup truck, a van, a car, or a motorcycle. More details of the CA/AD vehicle 101 may be illustrated in FIG. 2.

In embodiments, the RSU 103 may be one or more hardware computer devices configured to provide wireless communication services to mobile devices (for example, the CA/AD vehicle 101 or some other suitable device) within a coverage area or cell associated with the RSU 103. The RSU 103 includes a transmitter/receiver (or alternatively, a transceiver) connected to one or more antennas, one or more memory devices, one or more processors, one or more network interface controllers, and/or other like components. The one or more transmitters/receivers are configured to transmit/receive data signals to/from one or more mobile devices via a link. Furthermore, one or more network interface controllers are configured to transmit/receive with various network elements (e.g., one or more servers within a core network, etc.) over another backhaul connection (not shown).

As an example, the RSU 103 may be a base station associated with a cellular network (e.g., an eNB in an LTE network, a gNB in a new radio access technology (NR) network, a WiMAX base station, etc.), a remote radio head, a relay radio device, a small cell base station (e.g., a femtocell, picocell, home evolved nodeB (HeNB), and the like), or other like network element. In addition, the RSU 103 may be a road embedded reflector, a smart street or traffic light, a road side tag, or a stationary user equipment (UE) type RSU.

In embodiments, the cloud 105 may represent the Internet, one or more cellular networks, a local area network (LAN) or a wide area network (WAN) including proprietary and/or enterprise networks, transfer control protocol (TCP)/internet protocol (IP)-based network, or combinations thereof. In such embodiments, the cloud 105 may be associated with network operator who owns or controls equipment and other elements necessary to provide network-related services, such as one or more base stations or access points (e.g., the RSU 103), one or more servers for routing digital data or telephone calls (for example, a core network or backbone network), etc. Implementations, components, and protocols used to communicate via such services may be those known in the art and are omitted herein for the sake of brevity.

In some embodiments, the cloud 105 may be a system of computer devices (e.g., servers, storage devices, applications, etc. within or associated with a data center or data warehouse) that provides access to a pool of computing resources. The term "computing resource" refers to a physical or virtual component within a computing environment and/or within a particular computer device, such as memory space, processor time, electrical power, input/output operations, ports or network sockets, and the like. In these embodiments, the cloud 105 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 105 and database systems) may coordinate the delivery of data to the CA/AD vehicle 101. Implementations, components, and protocols used to communicate via such services may be those known in the art and are omitted herein for the sake of brevity.

Figure 2:
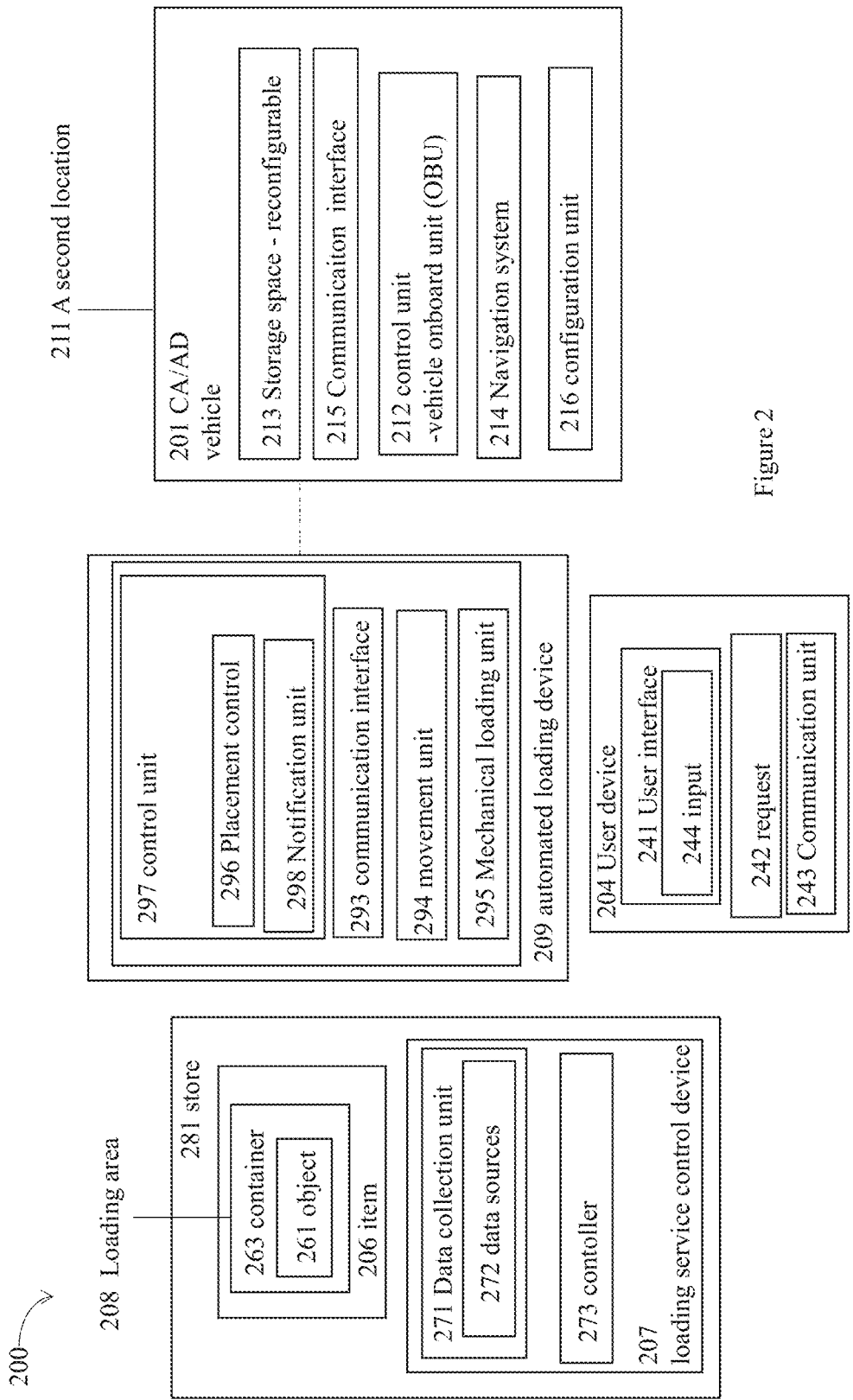
FIG. 2 illustrates another example system including a loading service control device and an automated loading device to provide a loading service to load one or more items into a storage space of a CA/AD vehicle, in accordance with various embodiments.

FIG. 2 illustrates another example system 200 including a loading service control device 207 and an automated loading device 209 to provide a loading service to load one or more items 206 into a storage space 213 of a CA/AD vehicle 201, in accordance with various embodiments. In embodiments, the CA/AD vehicle 201, the loading service control device 207, and the automated loading device 209 may be examples of the CA/AD vehicle 101, the loading service control device 107, and the automated loading device 109, as described in FIG. 1.

In embodiments, the system 200 includes the CA/AD vehicle 201, a user device 204, the loading service control device 207, and the automated loading device 209. The user device 204 is configured to generate a request 242 to the loading service control device 207 to load the one or more items 206 into the storage space 213 of the CA/AD vehicle 201 using the automated loading device 209. The one or more items 206 may be from a store 281 and located at a first location 208, which may be within the store 281, e.g., a loading area, while the CA/AD vehicle 201 is located in a second location 211, e.g., a parking lot of the store 281. The store 281 may be a shopping mall, a commercial establishment, or even any other places. The automated loading device 209 may be a standalone device or part of CA/CA vehicle 201.

In embodiments, an item of the one or more items 206 to be loaded may include an object 261 included in a container or a package 263, and may have various characteristics. The characteristics of an item of the one or more items 206 includes an object type of the item, a class of the item, a size of the item, a weight of the item, a package of the item, or a user preference of the item. The object type of the item includes a perishable item, a bulky item, a heavy item, or a fragile item; the class of the item includes a grocery item, a furniture item, or a luggage item; the package of the item 263 includes a bag or a box; and the user preference of the item includes a special care item, a routine item, or a least important item.

In embodiments, the user device 204 may be various computing or communication device, e.g., a smart phone, an IPAD, a mobile device, a wearable device, a laptop, a 2-in-1 device, or a tablet. The user device 204 includes a user interface 241 and a communication unit 243 coupled to the user interface 241. The user interface 241 is to receive an input 244 from a user to generate the request 242 to the loading service control device 207 to load the one or more items 206 into the storage space 213 of the CA/AD vehicle 201 using the automated loading device 209. In some embodiments, the request 242 may be generated automatically by the loading service control device 207 based on various data collected about the one or more items 206 without any user input. Furthermore, the request 242 may be directed to the automated loading device 209 without going through the loading service control device 207.

In embodiments, the input 244 includes various information, e.g., a time for the automated loading device 209 to load the one or more items 206 into the storage space 213 of the CA/AD vehicle 201, a user profile, information about the CA/AD vehicle 201, characteristics of the one or more items 206, or one or more environment parameters. In detail, the information about the CA/AD vehicle 201 may include maker, year, model, or color of the CA/AD vehicle 201, where the CA/AD vehicle 201 is parked, or key to authenticate to the CA/AD vehicle 201 to open the storage space 213. The input 244 may further include a user identification, where the user identification is to access a user account or a user profile including information about the CA/AD vehicle 201. In some embodiments, the input 244 may be collected from other data sources, such as a data source 272 of the loading service control device 207.

In embodiments, the communication unit 243 is configured to send the request 242 for the loading service by the automated loading device 209. The request 242 may be sent to the loading service control device 207. In some other embodiments, the request 242 may (also) be sent to the CA/AD vehicle 201 or the automated loading device 209. The communication unit 243 is further to receive a notification from the loading service control device 207 when the automated loading device 209 is ready to load, is loading, or has completed loading the one or more items 206 into the storage space 213 of the CA/AD vehicle 201.

In embodiments, the loading service control device 207 includes a data collection unit 271, and a controller 273 coupled to the data collection unit 271. The data collection unit 271 is to collect data from one or more data sources 272. The controller 273 is to initiate the loading service to load the one or more items 206 at the first location 208 into the storage space 213 of the CA/AD vehicle 201, using the automated loading device 209.

In embodiments, the collected data from the one or more data sources 272 include a user request for the loading service, data from a sensor, data form one or more other user devices, or data from one or more other CA/AD vehicles. Hence, the one or more data sources 272 may be a sensor, one or more other user devices, or one or more other CA/AD vehicles. For example, the data from a sensor, one or more other user devices, or one or more other CA/AD vehicles include one or more selected from radar data, ultrasonic sensor data, video sensor data, camera data, light detection and ranging (LiDAR) data, global positioning system (GPS) data, or inertial sensor data. As another example, the collected data may be shared among multiple services, stores, or users. One store may have some peak hours and demands for the loading services different from another store. Stores with complementary peak hours may share the automated loading device 209.

In embodiments, the controller 273 is to initiate the loading service to load the one or more items 206 based on the request 242. Additionally and alternatively, the controller 273 is to initiate the loading service based on the collected data from the one or more data sources 272. The controller 273 is to identify what kind of help to be provided, where and when, to load the one or more items 206, using a predictive algorithm that may watch a user to make a prediction whether the shopper is more likely to request attention (for example, an older shopper or someone who looks like they recently hurt their back).

In embodiments, the controller 273 is to initiate the loading service to load the one or more items 206 at the first location 208 into the storage space 213 of the CA/AD vehicle 201, using the automated loading device 209. In detail, the controller 273 may analyze a request for the loading service, e.g., the request 242 from the user device 204, availability of the automated loading device 209, and availability of a loading spot at the first location 208, to schedule a time to initiate the loading service. In addition, the controller 273 is further to notify the user device 204 the loading service has been initiated. Furthermore, the controller 273 is to communicate with the automated loading device 209 the collected data about the one or more items 206 or about the CA/AD vehicle 201. The controller 273 may further instruct the CA/AD vehicle 201 to move from the second location 211 to the first location 208 for loading the one or more items 206 into the storage space 213 of the CA/AD vehicle 201. Moreover, the controller 207 is to authenticate the CA/AD vehicle 201 before the one or more items 206 are loaded into the storage space 213 of a CA/AD vehicle 201.

In embodiments, the CA/AD vehicle 201 includes the storage space 213, a communication interface 215, a control unit 212, a configuration unit 216, and a navigation system 214. The storage space 213 may include a storage compartment of the CA/AD vehicle 201, a trunk space of the CA/AD vehicle 201, a seat space, or a top of a roof of the CA/AD vehicle 201. In embodiments, the storage space may be reconfigurable, e.g., having the rear seats flipped down to become expanded storage space, along with the trunk space.

In embodiments, the communication interface 215 is to receive information from the loading service control device 207 to load one or more items 206 into the storage space 213 using the automated loading device 209. The received information includes characteristics of the one or more items 206, a location of the one or more items, e.g., the first location 208, a time to load the one or more items 206, or one or more environment parameters.

In embodiments, the control unit 212 is to issue instructions to the navigation system 214 to move the CA/AD vehicle 201 to the first location 208, e.g., a loading area, at an appointed time, based on the received information. When the automated loading device 209 is not a part of the CA/AD vehicle 201, the control unit 212 is further to instruct the navigation system 214 to align the CA/AD vehicle 201 with the automated loading device 209 to receive the one or more items 206. Additionally and alternatively, when the automated loading device 209 is a part of the CA/AD vehicle 201, the control unit 212 is further to deploy/extend the automated loading device 209 to load the one or more items 206. The control unit 212 further requests the navigation system 214 to adjust or determine a subsequent driving route or a subsequent parking space based on having placement of the one or more items 206 in the storage space 213, or the collected data including the user profile, the information about the CA/AD vehicle 201, the characteristics of the one or more items 206, or the one or more environment parameters. For example, after the one or more items 206 have been loaded into the CA/AD vehicle 201 by the automated loading device 209, a user may go to additional places on a hot day. The control unit 212 may request the navigation system 214 to park in a shaded area to protect the one or more items 206 from being spoiled in a hot temperature. Additionally and alternatively, the control unit 212 may move the perishables items to a different spot, and/or turn the AC on in order to cool down the inside of the storage space 213.

In some embodiments, the configuration unit 216 is to reconfigure the storage space 213 based on a user profile, the information about the CA/AD vehicle 201, or the received information including the characteristics of the one or more items 206. For example, a bottom surface of the storage compartment of the CA/AD vehicle 201 may rotate to provide better protection for the one or more items 206 depending of the item contents as well as the physical location of the CA/AD vehicle 201. As another example, the configuration unit 216 may rearrange the placements of the one or more items 206 inside the CA/AD vehicle 201 on a continuous basis to preserve the safety of the one or more items 206. The configuration unit 216 may also rearrange the placements of the one or more items 206 when additional items may be purchased by a user to be placed into the storage space 213.

In embodiments, the automated loading device 209 may be a part of the CA/AD vehicle 201, placed in a robot separated from the CA/AD vehicle 201, installed as part of a moving cart, or located in a fixed device at the first location 208. The automated loading device 209 includes a communication interface 293, a mechanical loading unit 295, and a control unit 297 that may include a placement control unit 296 and a notification unit 298. When the automated loading device 209 is a standalone device, it further includes a movement unit 294 to move the automated loading device 209 from the first location 208 to the second location 211 where the CA/AD vehicle is located, or to other locations. In other embodiments, as described earlier, the automated loading device 209 may be attached to the CA/AD vehicle 201 and configured to be able to extend beyond the CA/AD vehicle 201 to perform the loading, and retract afterwards.

In embodiments, the communication interface 293 is to receive information from the loading service control device 207. The mechanical loading unit 295 is to place the one or more items 206 into the storage space 213 of the CA/AD vehicle 201, based on the received information including a user profile, information about the CA/AD vehicle 201, characteristics of the one or more items 206, or one or more environment parameters. The mechanical loading unit 295 is arranged to identify the characteristics of the one or more items 206, and place the one or more items 206 into storage locations of the storage space 213 by applying an algorithm to shorten an amount of time to load, increase number of items loaded, increase safety in preserving the one or more items 206, based on the characteristics of the one or more items 206, the user profile, the information about the CA/AD vehicle 201, or the one or more environment parameters. For example, perishable items may be placed in storage locations of the storage space 213 to be protected from direct sun light. The placement control unit 296 of the control unit 297 may apply the algorithm, which may be based on an algorithm for a knapsack problem, an algorithm for an assignment problem, or a linear programming algorithm. In addition, the notification unit 298 is to provide a notification message that there is not enough space in the storage space to place the one or more items 206, based on the received information including the user profile, information about the CA/AD vehicle 201, the characteristics of the one or more items 206, or the one or more environment parameters.

In embodiments, the control unit 212 of the CA/AD vehicle 201, the controller 273 of the loading service control device 207, or the control unit 297 of the automated loading device 209, may be any type of computer device that is capable of performing operations. For example, the control unit 212 of the CA/AD vehicle 201 may be a vehicle onboard unit (OBU) that is mounted on, built into, or otherwise embedded in the CA/AD vehicle 201. In some embodiments, The control unit 212, the controller 273, or the control unit 297 may be a computer device used to control one or more systems of the CA/AD vehicle 201, the loading service control device 207, or the automated loading device 209, such as an ECU, ECM, embedded system, microcontroller, control module, EMS, OBD devices, DME, MDTs, etc. The control unit 212, the controller 273, the control unit 297 may include one or more processors (having one or more processor cores and optionally, one or more hardware accelerators), memory devices, communication devices, etc. that may be configured to carry out various functions according to the various embodiments discussed here. For example, The control unit 212, the controller 273, the control unit 297 may be the computing platform 700 shown in FIG. 7, and may execute instructions stored in a computer-readable medium, e.g., the computer-readable medium 802 as shown in FIG. 8, or may be pre-configured with the logic (e.g., with appropriate bit streams, logic blocks, etc.). In embodiments, The control unit 212, the controller 273, the control unit 297 may be implemented in hardware, e.g., ASIC, or programmable combinational logic circuit (e.g., (FPGA)), or software (to be executed by a processor and memory arrangement), or combination thereof.

Figure 3:
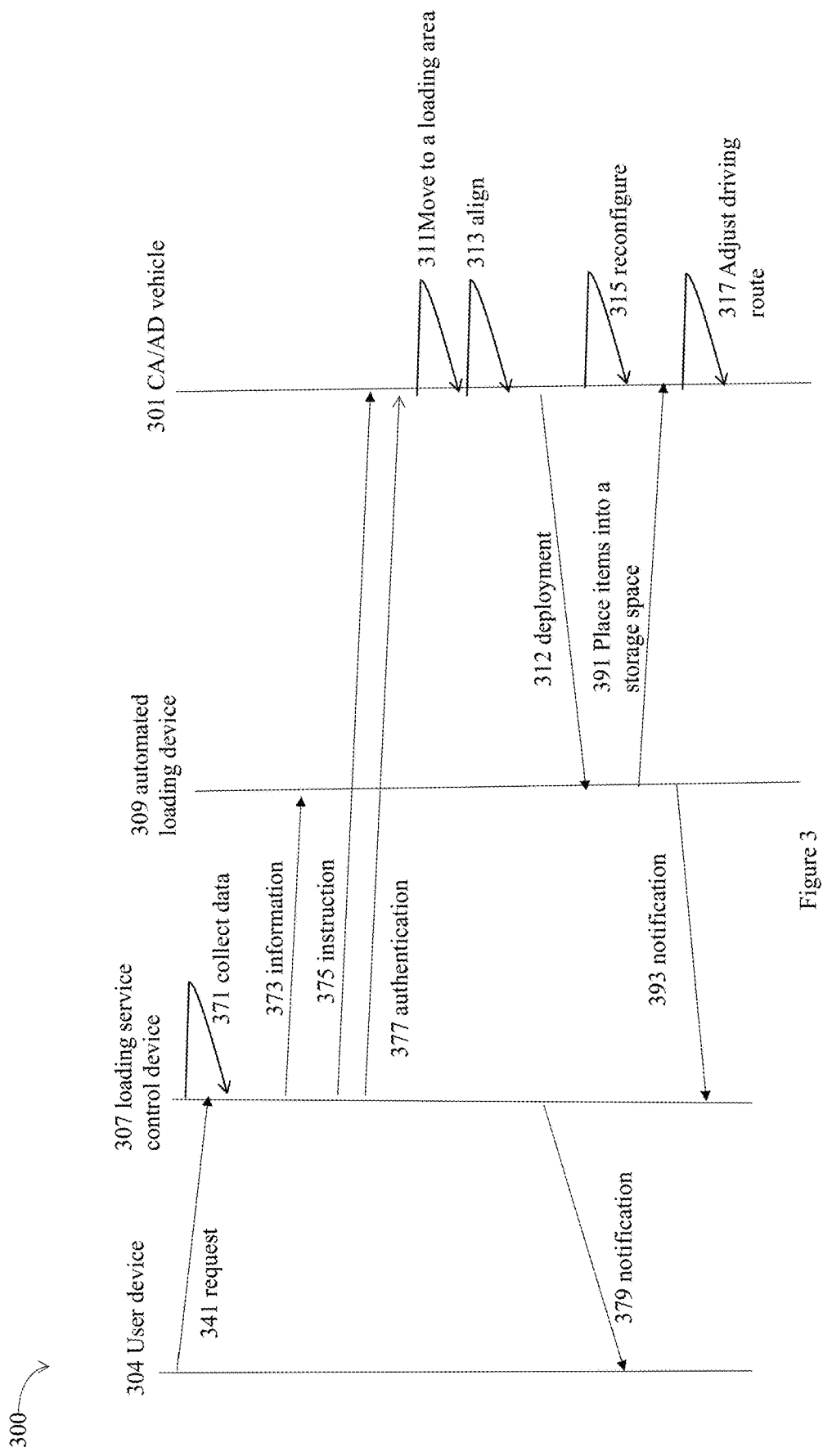
FIG. 3 illustrates an example operational flow for a loading service control device and an automated loading device to load one or more items into a storage space of a CA/AD vehicle, in accordance with various embodiments.

FIG. 3 illustrates an example operational flow 300 for a loading service control device 307 and an automated loading device 309 to load one or more items into a storage space of a CA/AD vehicle 301, in accordance with various embodiments. In embodiments, the CA/AD vehicle 301, the loading service control device 307, and the automated loading device 309 may be examples of the CA/AD vehicle 101, the loading service control device 107, and the automated loading device 109, as described in FIG. 1; or the CA/AD vehicle 201, the loading service control device 207, and the automated loading device 209, as described in FIG. 2.

In embodiments, the user device 304 is to perform operation 341 to send a request to the loading service control device 307 to load one or more items into a storage space of the CA/AD vehicle 301 using the automated loading device 309. The request may be generated by the user device 304 based on an input received by the user device 304 from a user. In addition, the user device 304 is to perform operation to receive a notification from the loading service control device 307 when the automated loading device 309 is ready to load, is loading, or has completed loading the one or more items into the storage space of the CA/AD vehicle 301.

In embodiments, the loading service control device 307 is to perform operation 371 to collect data from one or more data sources. The loading service control device 307 is to receive a user request for a loading service from the user device 304. Based on the collected data and the received request, the loading service control device 307 is to initiate a loading service to load the one or more items into the storage space of the CA/AD vehicle 301, using the automated loading device 309. In detail, the loading service control device 307 may analyze a request for the loading service, availability of the automated loading device 309, and availability of a loading spot, to schedule a time to initiate the loading service.

In embodiments, the loading service control device 307 is to perform operation 373 to communicate with the automated loading device 309 the collected data about the one or more items or about the CA/AD vehicle 301. In addition, the loading service control device 307 is to perform operation 375 to further instruct the CA/AD vehicle 301 to move from one location to another location for loading the one or more items into the storage space of the CA/AD vehicle 301. Moreover, the loading service control device 307 is to perform operation 377 to authenticate the CA/AD vehicle 301 before the one or more items are loaded into the storage space of the CA/AD vehicle 301. Furthermore, the loading service control device 307 is to perform operation 379 to notify the user device 304 the loading service has been initiated.

In embodiments, the automated loading device 309 is to perform operations to receive information from the loading service control device 307. Furthermore, the automated loading device 309 is to perform operation 391 to place the one or more items into a storage space of the CA/AD vehicle 301, based on the received information including a user profile, information about the CA/AD vehicle 301, characteristics of the one or more items, or one or more environment parameters. Moreover, the automated loading device 309 is to perform operation 393 to provide a notification message to the loading service control device 307 that there is not enough space in the storage space to place the one or more items, based on the received information including the user profile, information about the CA/AD vehicle, the characteristics of the one or more items, or the one or more environment parameters.

In embodiments, the CA/AD vehicle 301 is to perform operations to receive information from the loading service control device 307 to load one or more items into a storage space of the CA/AD vehicle 301 using the automated loading device 309. The received information includes characteristics of the one or more items, a location of the one or more items, a time to load the one or more items, or one or more environment parameters.

In embodiments, the CA/AD vehicle 301 is to perform operation 311 to move the CA/AD vehicle 301 to a loading area, at an appointed time, based on the received information. In addition, when the automated loading device 309 is not a part of the CA/AD vehicle 301, the CA/AD vehicle 301 is to perform operation 313 to align the CA/AD vehicle 301 with the automated loading device 309 to receive the one or more items. Additionally and alternatively, when the automated loading device 309 is a part of the CA/AD vehicle 301, the CA/AD vehicle 301 is to perform operation 312 to deploy the automated loading device 309 to load the one or more items. The CA/AD vehicle 301 is to perform operation to receive the one or more items loaded by the automated loading device 309 into the storage space of the CA/AD vehicle 301. In some embodiments, the CA/AD vehicle 301 is to perform operation 315 to reconfigure the storage space based on a user profile, the information about the CA/AD vehicle 301, or the received information including the characteristics of the one or more items. After the one or more items have been loaded into the storage space of the CA/AD vehicle 301, the CA/AD vehicle 301 is to perform operation 317 to adjust or determine a driving route or a parking space based on the placement of the one or more items in the storage space, or the collected data including the user profile, the information about the CA/AD vehicle 301, the characteristics of the one or more items, or the one or more environment parameters.

Figure 4:
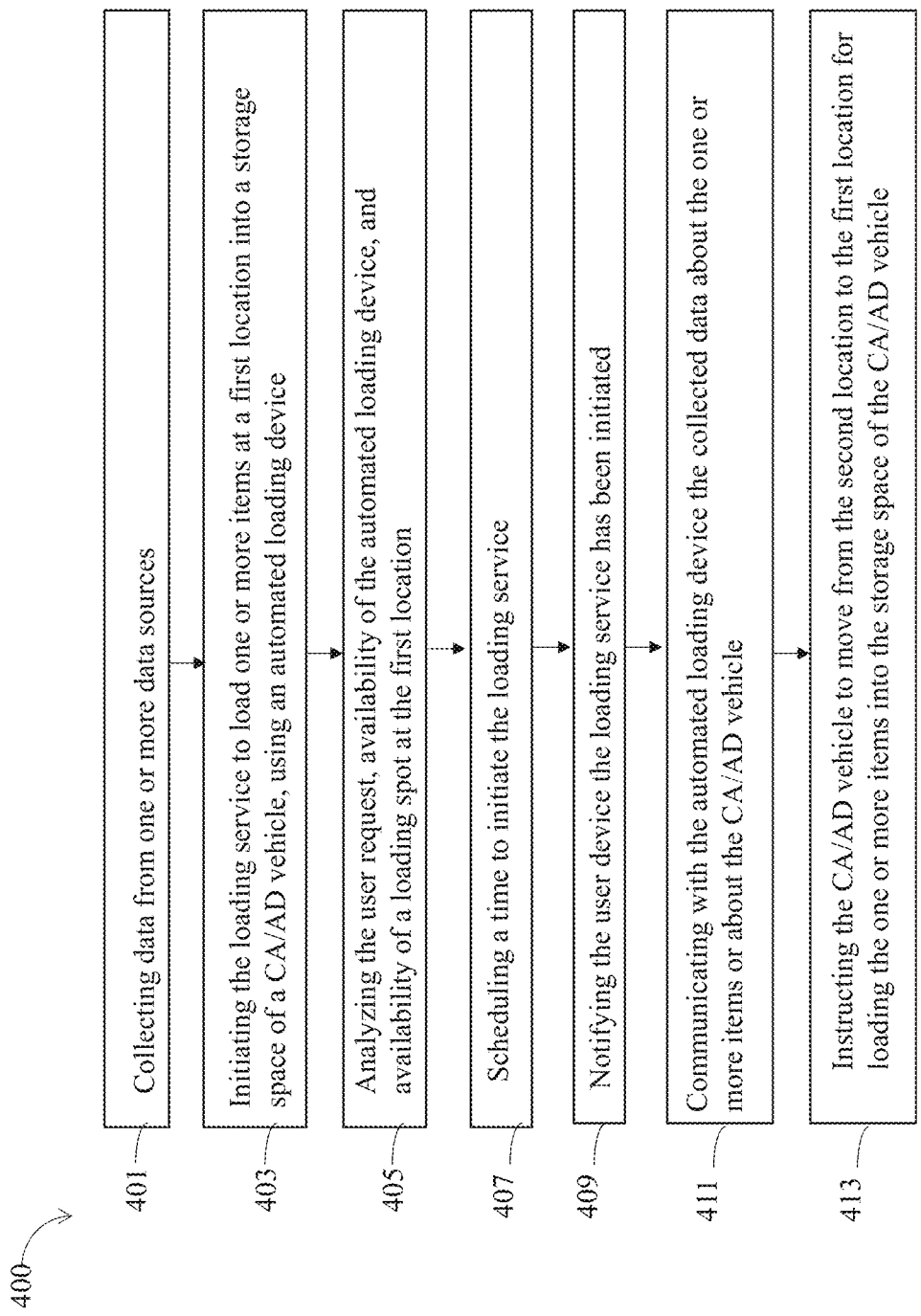
FIG. 4 illustrates an example process for a loading service control device to control an automated loading device to load one or more items into a storage space of a CA/AD vehicle, in accordance with various embodiments.

FIG. 4 illustrates an example process 400 for a loading service control device to control an automated loading device to load one or more items into a storage space of a CA/AD vehicle, in accordance with various embodiments. In embodiments, the process 400 may be a process performed by a loading service control device, e.g., the loading service control device 207, or the loading service control device 107.

The process 400 may start at an interaction 401. During the interaction 401, a data collection unit of the loading service control device collects data from one or more data sources. For example, at the interaction 401, the data collection unit 271 of the loading service control device 207 collects data from one or more data sources 272.

During an interaction 403, a controller of the loading service control device initiates the loading service to load one or more items at a first location into a storage space of a CA/AD vehicle parked at a second location, using an automated loading device. For example, at the interaction 403, the controller 273 of the loading service control device 207 initiates the loading service to load one or more items 206 at the first location 208 into the storage space 213 of the CA/AD vehicle 201 parked at the second location 211, using the automated loading device 209.

During an interaction 405, the controller of the loading service control device analyzes the user request, availability of the automated loading device, and availability of a loading spot at the first location. For example, at the interaction 405, the controller 273 of the loading service control device 207 analyzes the user request, availability of the automated loading device 209, and availability of a loading spot at the first location.

During an interaction 407, the controller of the loading service control device schedules a time to initiate the loading service. For example, at the interaction 407, the controller 273 of the loading service control device 207 schedules a time to initiate the loading service.

During an interaction 409, the controller of the loading service control device notifies a user device the loading service has been initiated. For example, at the interaction

409, the controller 273 of the loading service control device 207 notifies the user device 204 the loading service has been initiated.

During an interaction 411, the controller of the loading service control device communicates with the automated loading device the collected data about the one or more items or about the CA/AD vehicle. For example, at the interaction 411, the controller 273 of the loading service control device 207 communicates with the automated loading device 209 the collected data about the one or more items or about the CA/AD vehicle 201.

During an interaction 413, the controller of the loading service control device instructs the CA/AD vehicle to move from the second location to the first location for loading the one or more items into the storage space of the CA/AD vehicle. For example, at the interaction 411, the controller 273 of the loading service control device 207 instructs the CA/AD vehicle 201 to move from the second location 211 to the first location 208 for loading the one or more items 206 into the storage space of the CA/AD vehicle 201.

Figure 5:
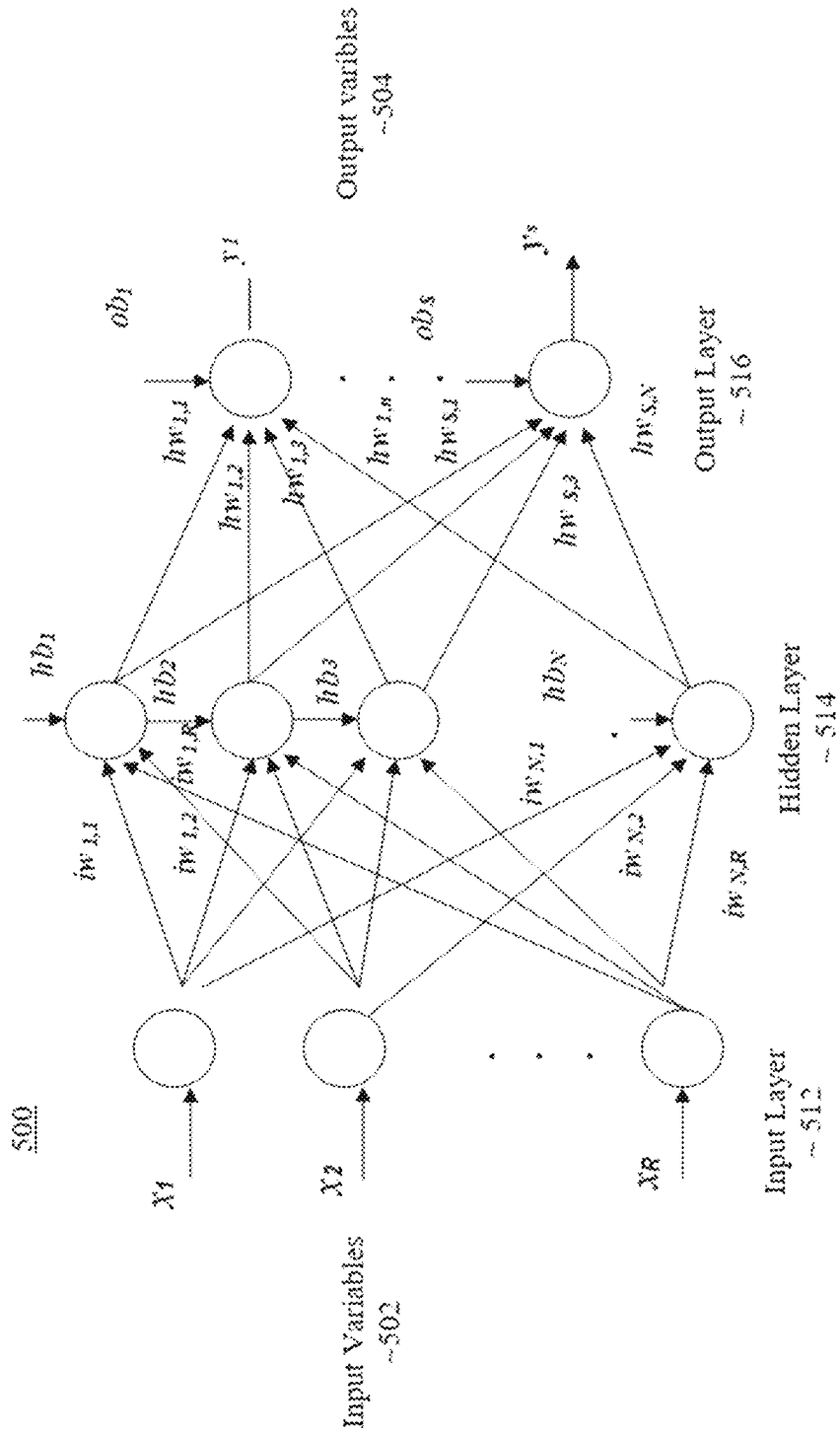
FIG. 5 illustrates an example neural network suitable for use with present disclosure, in accordance with various embodiments.

FIG. 5 illustrates an example neural network 500 suitable for use with present disclosure, in accordance with various embodiments. In embodiments, the neural network 500 may be used to implement various decisions in the process 400, made by a loading service control device, e.g., the loading service control device 207, or the loading service control device 107. Similarly, the neural network 500 may be used to implement various decisions or operations in the operational flow 300 for the loading service control device 307 and the automated loading device 309 to load one or more items into a storage space of the CA/AD vehicle 301.

As shown, the neural network 500 may be a multilayer feedforward neural network (FNN) comprising an input layer 512, one or more hidden layers 514 and an output layer 516. Input layer 512 receives data of input variables ($x_i$) 502. Hidden layer(s) 514 processes the inputs, and eventually, output layer 516 outputs the determinations or assessments ($y_i$) 504. In one example implementation the input variables ($x_i$) 502 of the neural network are set as a vector containing the relevant variable data, while the output determination or assessment ($y_i$) 504 of the neural network are also as a vector.

Multilayer feedforward neural network (FNN) may be expressed through the following equations:

$$ho_i = f(\Sigma_{j=1}^{R}(iw_{i,j}x_j) + hb_i), \text{ for } i=1, \ldots, N$$

$$y_i = f(\Sigma_{k=1}^{N}(hw_{i,k}ho_k) + ob_i), \text{ for } i=1, \ldots, S,$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2,$$

where $y_{kp}$ and $t_{kp}$ are the predicted and the target values of pth output unit for sample k, respectively, and m is the number of samples.

In one use, the input variables ($x_i$) 502 may include the collected data from the one or more data sources regarding the items to be loaded, and characteristics of the storage space of the CA/AD vehicle. The output variables ($y_i$) 504 may include a plan on how the items are to be loaded and stored in the storage space of the CA/AD vehicle. In another use, the input variables ($x_i$) 502 may include characteristics of the items loaded. The output variables ($y_i$) 504 include adjustment associated with a subsequent route or parking for the CA/AD vehicle.

In this example, for simplicity of illustration, there is only one hidden layer in the neural network. In some other embodiments, there can be many layers of hidden layers. Furthermore, the neural network can be in some other types of topology, such as Convolution Neural Network (CNN) or Recurrent Neural Network (RNN).

Figure 6:
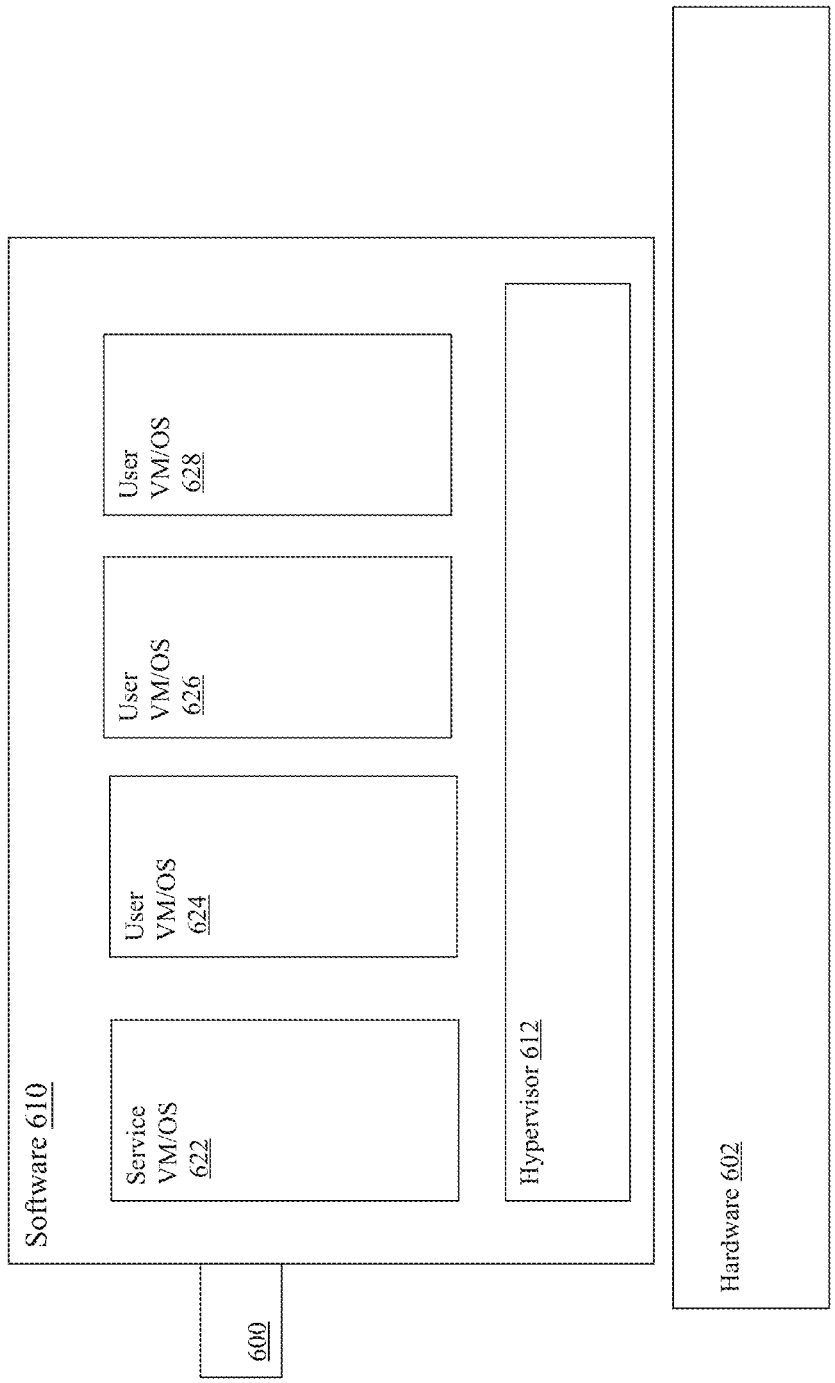
FIG. 6 illustrates a software component view of a system for a loading service control device to control an automated loading device to load one or more items into a storage space of a CA/AD vehicle, in accordance with various embodiments.

FIG. 6 illustrates a software component view of a system 600 for a loading service control device to control an automated loading device to load one or more items into a storage space of a CA/AD vehicle, in accordance with various embodiments. As shown, for the embodiments, the system 600 includes hardware 602 and software 610, which could implement functions, e.g., the process 400, performed by a loading service control device, e.g., the loading service control device 207, or the loading service control device 107; or the operational flow 300 for the loading service control device 307 and the automated loading device 309 to load one or more items into a storage space of the CA/AD vehicle 301.

Software 610 includes hypervisor 612 hosting a number of virtual machines (VMs) 622-628. Hypervisor 612 is configured to host execution of VMs 622-628. The VMs 622-628 include a service VM 622 and a number of user VMs 624-628. Service VM 622 includes a service OS hosting execution of system services and utilities. User VMs 624-628 may include one or more user VMs having user OS hosting execution of the loading service control device 307.

In embodiments, elements 612-628 of software 610 may be any one of a number of these elements known in the art. For example, hypervisor 612 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, service OS of service VM 622 and user OS of user VMs 624-628 may be any one of a number of OS known in the art, such as Linux, available e.g., from Red Hat Enterprise of Raleigh, N.C., or Android, available from Google of Mountain View, Calif.

Figure 7:
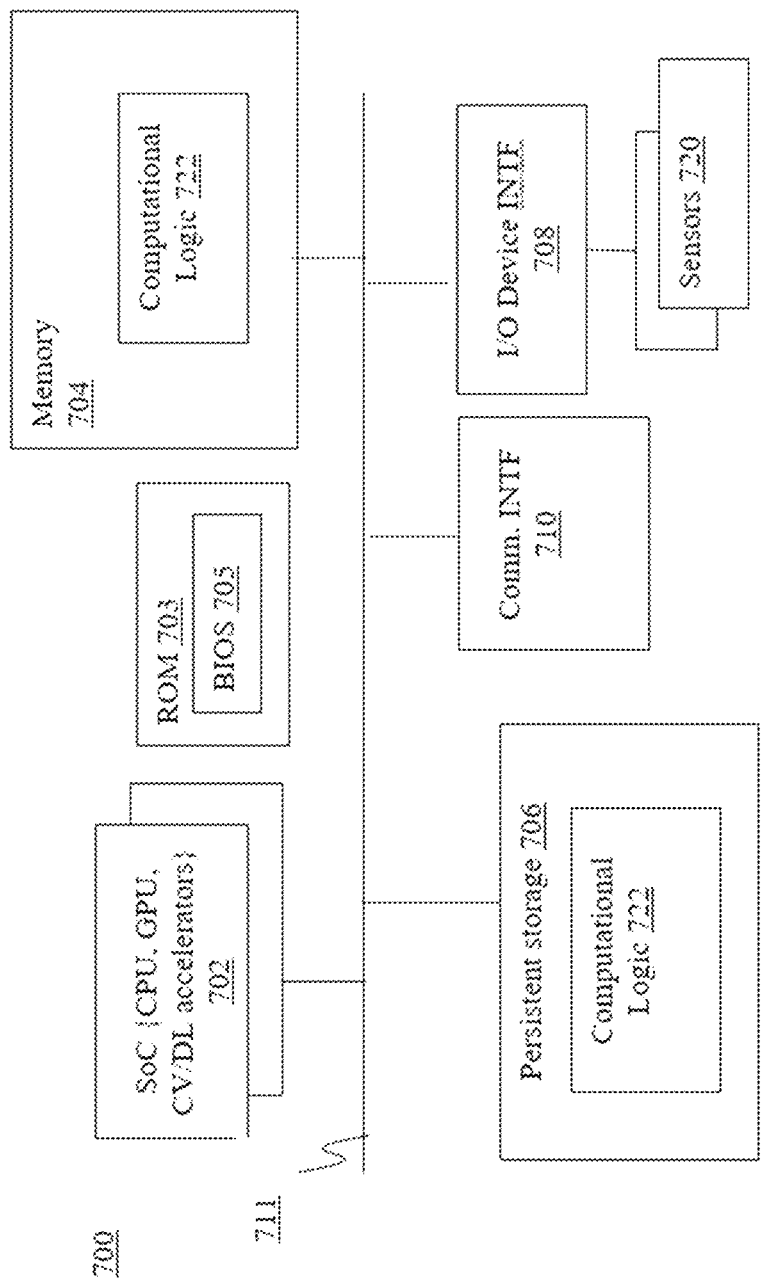
FIG. 7 illustrates a hardware component view of a computing platform for a loading service control device to control an automated loading device to load one or more items into a storage space of a CA/AD vehicle, in accordance with various embodiments.
Figure 8:
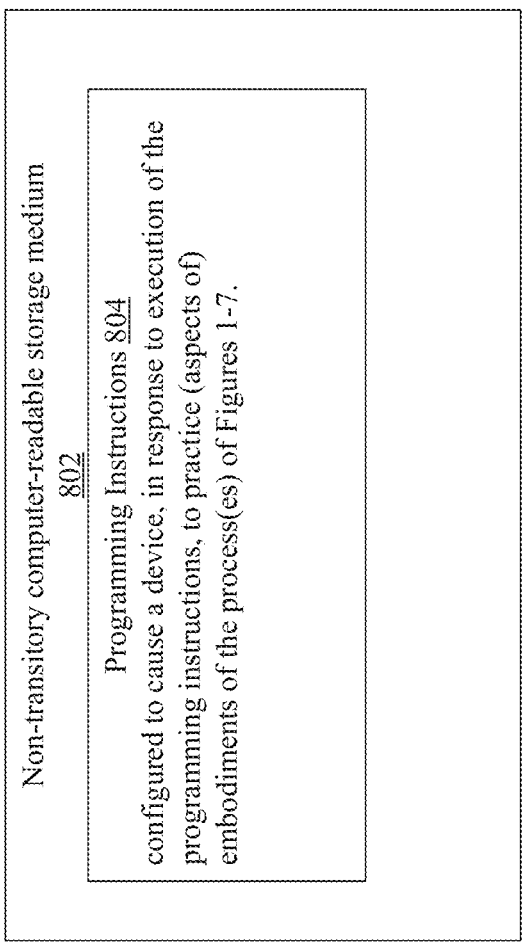
FIG. 8 illustrates a storage medium having instructions for practicing methods described with references to FIGS. 1-7, in accordance with various embodiments.

FIG. 7 illustrates a hardware component view of a computing platform 700 for a loading service control device to control an automated loading device to load one or more items into a storage space of a CA/AD vehicle, in accordance with various embodiments. As shown, the computing platform 700, which may be hardware 602 of FIG. 6, may include one or more SoCs 702, ROM 703 and system memory 704. Each SoCs 702 may include one or more processor cores (CPUs), one or more graphics processor units (GPU), one or more accelerators, such as computer vision (CV) and/or deep learning (DL) accelerators. ROM 703 may include BIOS 705. CPUs, GPUs, and CV/DL accelerators may be any one of a number of these elements known in the art. Similarly, ROM 703 and basic input/output system services (BIOS) 705 may be any one of a number of ROM and BIOS known in the art, and system memory 704 may be any one of a number of volatile storage known in the art.

Additionally, computing platform 700 may include persistent storage devices 706. Example of persistent storage devices 706 may include, but are not limited to, flash drives, hard drives, compact disc read-only memory (CD-ROM) and so forth. Further, computing platform 700 may include input/output (I/O) interface 708 to interface with one or more I/O devices (such as sensors 720, or display, keyboard, cursor control (not shown) and so forth). Still further, computing platform 700 may include communication interfaces 710 (such as network interface cards, modems and so forth). Communication devices interfaced with communication interface 708 may include any number of communication devices known in the art. Examples of communication devices may include, but are not limited to, networking interfaces for Bluetooth®, Near Field Communication (NFC), WiFi, Cellular communication (such as LTE, 4G, or 5G) and so forth. The elements may be coupled to each other via system bus 712, which may represent one or more buses. In the case of multiple buses, they may be bridged by one or more bus bridges (not shown).

Each of these elements may perform its conventional functions known in the art. In particular, ROM 703 may include BIOS 705 having a boot loader. System memory 704 and mass storage devices 706 may be employed to store a working copy and a permanent copy of the programming instructions implementing the operations associated with hypervisor 612, service/user OS of service/user VM 622-628, or the process 400, collectively referred to as computational logic 722. The various elements may be implemented by assembler instructions supported by processor core(s) of SoCs 702 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 8 illustrates a storage medium having instructions for practicing methods described with references to FIGS. 1-7, in accordance with various embodiments. As shown, non-transitory computer-readable storage medium 802 may include a number of programming instructions 804. Programming instructions 804 may be configured to enable a device, e.g., computing platform 700, user device 104, control device 107, loading device 109 or CA/AD vehicle 101, in response to execution of the programming instructions, to implement (aspects of) hypervisor 612, service/user OS of service/user VM 622-628, the process 400, or the operational flow 300. In alternate embodiments, programming instructions 804 may be disposed on multiple computer-readable non-transitory storage media 802 instead. In still other embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for computer assisted or autonomous driving (CA/AD), comprising: a communication interface, disposed in a CA/AD vehicle, to receive information from a loading service control device to load one or more items into a storage space of the CA/AD vehicle, using an automated loading device, wherein the received information including characteristics of the one or more items, locations of the one or more items, a time to load the one or more items, or one or more environment parameters; and a control unit, coupled to the communication interface, to issue instructions to a navigation system of the CA/AD vehicle to move the CA/AD vehicle to a loading area at an appointed time, based on the received information.

Example 2 may include the apparatus of example 1 and/or some other examples herein, wherein the control unit is further to instruct the navigation system to align the CA/AD vehicle with the automated loading device to receive the one or more items, when the automated loading device is not a part of the CA/AD vehicle.

Example 3 may include the apparatus of example 1 and/or some other examples herein, wherein the control unit is further to deploy the automated loading device to load the one or more items when the automated loading device is a part of the CA/AD vehicle.

Example 4 may include the apparatus of example 1 and/or some other examples herein, further comprising: a configuration unit, coupled to the control unit, to reconfigure the storage space based on a user profile, the information about the CA/AD vehicle, or the received information including the characteristics of the one or more items.

Example 5 may include the apparatus of example 1 and/or some other examples herein, wherein the control unit further requests the navigation system to adjust or determine a driving route or a parking space based on the placement of the one or more items in the storage space, or the collected data including the user profile, the information about the CA/AD vehicle, the characteristics of the one or more items, or the one or more environment parameters.

Example 6 may include the apparatus of example 1 and/or some other examples herein, wherein the storage space includes a storage compartment of the CA/AD vehicle, a trunk space of the CA/AD vehicle, a seat space, or a top of a roof of the CA/AD vehicle.

Example 7 may include an apparatus for computer assisted or autonomous driving (CA/AD), comprising: a communication interface to receive information from a loading service control device; and a mechanical loading unit coupled to the communication interface to place one or more items into a storage space of a CA/AD vehicle, based on the received information including a user profile, information about the CA/AD vehicle, characteristics of the one or more items, or one or more environment parameters.

Example 8 may include the apparatus of example 7 and/or some other examples herein, wherein the characteristics of an item of the one or more items include an object type of the item, a class of the item, a size of the item, a weight of the item, a package of the item, or a user preference of the item.

Example 9 may include the apparatus of example 8 and/or some other examples herein, wherein the object type of the item includes a perishable item, a bulky item, a heavy item, or a fragile item; the class of the item includes a grocery item, a furniture item, or a luggage item; the package of the item includes a bag or a box; and the user preference of the item includes a special care item, a routine item, or a least important item.

Example 10 may include the apparatus of example 7 and/or some other examples herein, wherein the mechanical loading unit is arranged to identify the characteristics of the one or more items, and place the one or more items into storage locations of the storage space by applying an algorithm to shorten an amount of time to load, increase number of items loaded, increase safety in preserving the one or more items, based on the characteristics of the one or more items, the user profile, the information about the CA/AD vehicle, or the one or more environment parameters.

Example 11 may include the apparatus of example 10 and/or some other examples herein, wherein the algorithm is based on an algorithm for a knapsack problem, an algorithm for an assignment problem, or a linear programming algorithm.

Example 12 may include the apparatus of example 7 and/or some other examples herein, wherein the apparatus is a part of the CA/AD vehicle, placed in a robot separated from the CA/AD vehicle, installed as part of a moving cart, or located in a fixed device at a shopping location.

Example 13 may include the apparatus of example 7 and/or some other examples herein, when the apparatus is a standalone device, the apparatus further comprises a movement unit, coupled to the mechanical loading unit, to move the apparatus from a first location to a second location where the CA/AD vehicle is located.

Example 14 may include the apparatus of example 7 and/or some other examples herein, further comprising: a notification unit, coupled to the mechanical loading unit, to provide a notification message that there is not enough space in the storage space to place the one or more items, based on the received information including the user profile, information about the CA/AD vehicle, the characteristics of the one or more items, or the one or more environment parameters.

Example 15 may include an apparatus for computer assisted or autonomous driving (CA/AD), comprising: a data collection unit to collect data from one or more data sources; and a controller coupled to the data collection unit, based on the collected data including a user request from a user device for a loading service, to initiate the loading service to load one or more items at a first location into a storage space of a CA/AD vehicle, using an automated loading device, wherein the CA/AD vehicle is parked at a second location.

Example 16 may include the apparatus of example 15 and/or some other examples herein, wherein the controller is further to: analysis the user request, availability of the automated loading device, and availability of a loading spot at the first location; schedule a time to initiate the loading service.

Example 17 may include the apparatus of example 15 and/or some other examples herein, wherein the controller is further to: notify the user device the loading service has been initiated; communicate with the automated loading device the collected data about the one or more items or about the CA/AD vehicle, or instruct the CA/AD vehicle to move from the second location to the first location for loading the one or more items into the storage space of the CA/AD vehicle.

Example 18 may include the apparatus of example 15 and/or some other examples herein, wherein the controller is further to authenticate the CA/AD vehicle before the one or more items are loaded into the storage space of a CA/AD vehicle.

Example 19 may include the apparatus of example 15 and/or some other examples herein, wherein the collected data from the one or more data sources include a user request for the loading service, data from a sensor, data form one or more other user devices, or data from one or more other CA/AD vehicles.

Example 20 may include the apparatus of example 19 and/or some other examples herein, wherein data from the sensor, the one other more other user devices or one or more CA/AD vehicles include one or more selected from radar data, ultrasonic sensor data, video sensor data, camera data, light detection and ranging (LiDAR) data, global positioning system (GPS) data, or inertial sensor data.

Example 21 may include an apparatus for computer assisted or autonomous driving (CA/AD), comprising: a user interface to receive an input from a user, wherein the input includes information to generate a request to a loading service control device to load one or more items into a storage space of a CA/AD vehicle using an automated loading device; and a communication unit coupled to the user interface to send the request for the loading service by the automated loading device.

Example 22 may include the apparatus of example 21 and/or some other examples herein, wherein the communication unit is further to receive a notification from the loading service control device when the automated loading device is ready to load, is loading, or has completed loading the one or more items into the storage space of the CA/AD vehicle.

Example 23 may include the apparatus of example 21 and/or some other examples herein, wherein the input further includes a time for the automated loading device to load the one or more items into the storage space of the CA/AD vehicle, a user profile, information about the CA/AD vehicle, characteristics of the one or more items, or one or more environment parameters, and wherein the information about the CA/AD vehicle includes maker, year, model, or color of the CA/AD vehicle, where the CA/AD vehicle is parked, or key to authenticate to the CA/AD vehicle to open the storage space.

Example 24 may include the apparatus of example 21 and/or some other examples herein, wherein the input further includes a user identification, where the user identification is to access a user account or a user profile including information about the CA/AD vehicle, and wherein the information about the CA/AD vehicle includes maker, year, model, or color of the CA/AD vehicle, where the CA/AD vehicle is parked, or key to authenticate to the CA/AD vehicle to open the storage space.

Example 25 may include the apparatus of example 21 and/or some other examples herein, wherein the apparatus is a smart phone, an IPAD, a mobile device, a laptop, a wearable device, a 2-in-1 device, or a tablet.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computer assisted or autonomous driving (CA/AD), comprising:
   a communication interface, disposed in a CA/AD vehicle, to receive from a loading service control device of a store or shopping mall information associated with loading and placing one or more grocery items into a storage space of the CA/AD vehicle at a loading area of the store or shopping mall for loading or unloading passengers or goods, wherein the received information includes a location of the loading area of the store or shopping mall, and an appointed time selected by the loading service control device for the CA/AD vehicle to be at the loading area of the store or shopping mall to load and place the one or more grocery items into the storage space of the CA/AD vehicle, and wherein the location of the loading area of the store or shopping mall is different from a current location of the CA/AD vehicle; and
   a control unit, coupled to the communication interface, to issue instructions to a navigation system of the CA/AD vehicle to move the CA/AD vehicle from its current location to the loading area of the store or shopping mall, at the appointed time, based on the received information, to load and place the one or more grocery items into the storage space of the CA/AD vehicle; wherein the control unit is to further place the one or more grocery items into one or more spots of the storage space, condition an environment of the one or more spots of the storage space, and issue instructions to the navigation system to adjust or determine a subsequent parking space selection at a destination, taking into consideration object types of the one or more grocery items having been placed into the storage space to be transported by the CA/AD vehicle.

2. The apparatus of claim 1, wherein the control unit is further to instruct the navigation system to align the CA/AD vehicle with a robotic loading device to receive the one or more grocery items, wherein the robotic loading device is a separate aerial or terrestrial mobile robotic device launched from the CA/AD vehicle.

3. The apparatus of claim 1, wherein the control unit is further to launch the aerial or terrestrial mobile robotic loading device to load the one or more grocery items, when the CA/AD vehicle arrives or approaches the loading area at the appointed time.

4. The apparatus of claim 1, wherein the received information further includes characteristics of the one or more grocery items to be loaded, and the apparatus further comprises:
 a configuration unit, coupled to the control unit, to reconfigure the storage space based at least in part on information about the CA/AD vehicle, and the received characteristics of the one or more grocery items to be loaded.

5. The apparatus of claim 1, wherein the storage space includes a storage compartment of the CA/AD vehicle, a trunk space of the CA/AD vehicle, a seat space, or a top of a roof of the CA/AD vehicle.

6. An apparatus for computer assisted or autonomous driving (CA/AD), comprising:
 a communication interface, disposed in a CA/AD vehicle, to receive information to load one or more grocery items into a storage space of the CA/AD vehicle, wherein the received information includes characteristics of the one or more grocery items;
 an aerial or terrestrial mobile robotic device, disposed in the CA/AD vehicle, to be launched off the CA/AD vehicle to load the one or more grocery items into a storage space of the CA/AD vehicle, based on the received information that includes the characteristics of the one or more grocery items to be loaded; and
 a control unit, coupled to the communication interface, to issue instructions to the aerial or terrestrial mobile robotic device, to launch and load the one or more grocery items into the storage space of the CA/AD vehicle; wherein the control unit is to further place the one or more grocery items into one or more spots of the storage space, condition an environment of the one or more spots of the storage space, and issue instructions to adjust or determine a subsequent parking space selection at a destination, taking into consideration object types of the one or more grocery items having been placed into the storage space to be transported by the CA/AD vehicle;
wherein the characteristics of a grocery item of the one or more grocery items include an object type of the grocery item and packaging data of the grocery item; wherein the object type of the item indicates whether the grocery item is a perishable item, and the packaging data of the item indicates whether the grocery item is packed in a bag or a box.

7. The apparatus of claim 6, wherein the aerial or terrestrial mobile robotic device is arranged to identify the characteristics of the one or more grocery items, and place the one or more grocery items into storage locations of the storage space by applying an algorithm to increase safety in preserving the one or more grocery items, based on the characteristics of the one or more grocery items.

8. The apparatus of claim 7, wherein the algorithm is based on an algorithm for a knapsack problem, an algorithm for an assignment problem, or a linear programming algorithm.

9. The apparatus of claim 6, further comprising:
 a notification unit, coupled to the communication interface, to provide a notification message that there is not enough space in the storage space to load the one or more grocery items, based on the received information that includes the characteristics of the one or more grocery items.

10. An apparatus for computer assisted or autonomous driving (CA/AD), comprising:
 a data collection unit, disposed at a CA/AD vehicle, to collect data from one or more data sources; and
 a controller disposed at the CA/AD vehicle and coupled to the data collection unit, based on the collected data including information received from a loading service control device of a store or shopping mall for a loading service to load one or more grocery items at a loading area associated with the store or shopping mall, into a storage space of the CA/AD vehicle, at an appointed time selected by the loading service control device; and wherein the controller is to further cause the CA/AD vehicle to navigate from a current location to the loading area associated with the store or shopping mall at the appointed time to load and place the one or more grocery items into the storage space of the CA/AD vehicle, the current location and the loading area associated with the store or shopping mall being different locations; and wherein the control unit is to further place the one or more grocery items into one or more spots of the storage space, condition an environment of the one or more spots of the storage space, and issue instructions to adjust or determine a subsequent parking space selection at a destination, taking into consideration object types of the one or more grocery items having been placed into the storage space to be transported by the CA/AD vehicle.

11. The apparatus of claim 10, wherein the loading service control device is further to:
 analyze availability of an aerial or terrestrial mobile robotic device, and availability of the loading area associated with the store or shopping mall; and
 schedule the appointed time for the loading service.

12. The apparatus of claim 10, wherein the controller is further to:
 notify a user the loading service has been initiated;
 communicate with an aerial or terrestrial mobile robotic device about the collected data about the one or more grocery items to be loaded or about the CA/AD vehicle, and
 instruct a navigation system of the CA/AD vehicle to move from the current location to the loading area associated with the store or shopping mall for loading the one or more grocery items into the storage space of the CA/AD vehicle, as well as instruct the navigation system to adjust or select the driving route to a subsequent destination taking into consideration placement of the one or more grocery items in the storage space of the CA/AD vehicle.

13. The apparatus of claim 10, wherein the controller is further to authenticate the CA/AD vehicle before the one or more grocery items are loaded into the storage space of the CA/AD vehicle.

14. The apparatus of claim 10, wherein the collected data from the one or more data sources further include data from a sensor of the CA/AD vehicle and data from a user device of a user.

15. The apparatus of claim 14, wherein data from the sensor of the CA/AD vehicle and from the user device of the user include one or more selected from radar data, ultrasonic sensor data, video sensor data, camera data, light detection and ranging (LiDAR) data, global positioning system (GPS) data, or inertial sensor data.

* * * * *